C. S. BRADLEY.
ALTERNATING CURRENT MOTOR SYSTEM.
APPLICATION FILED MAY 7, 1908.
910,638.
Patented Jan. 26, 1909.
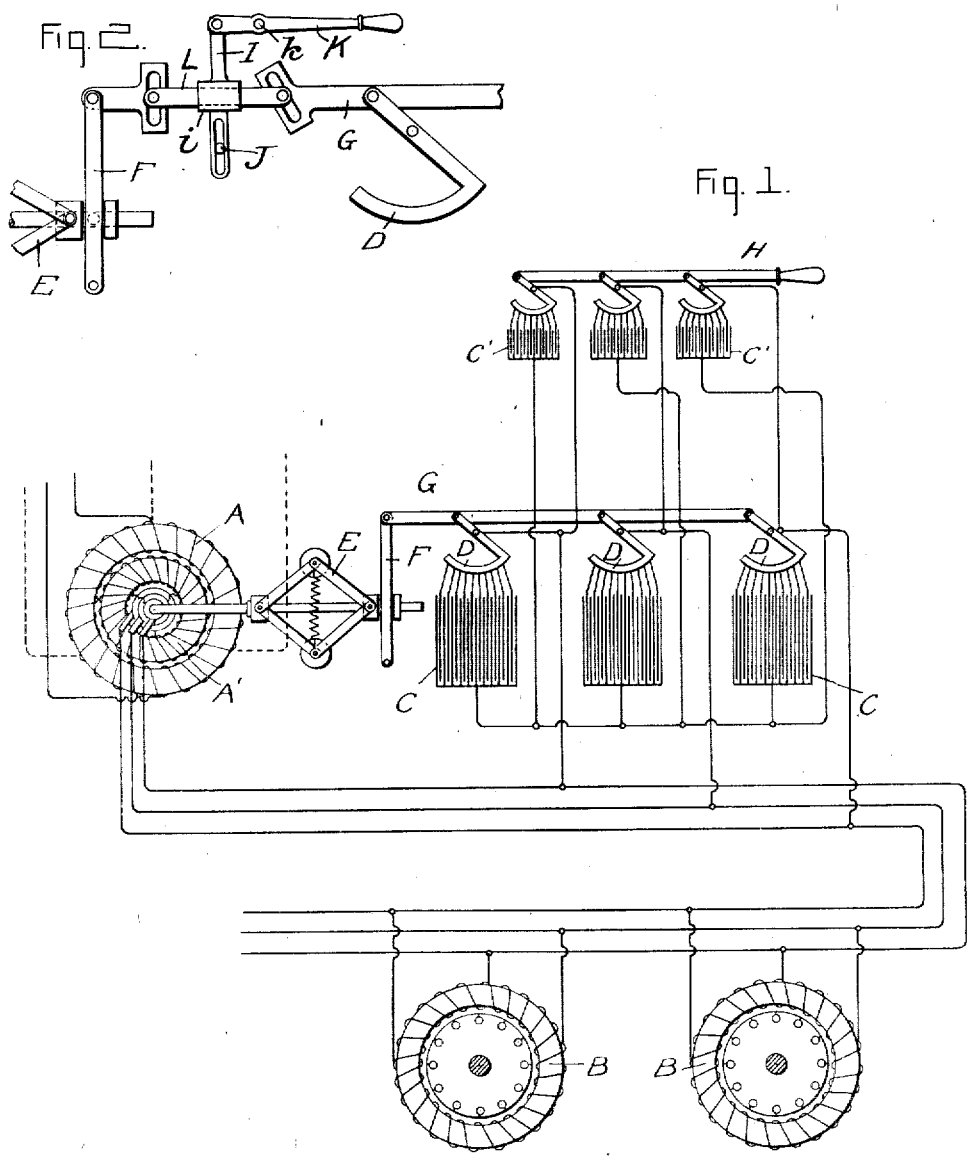
WITNESSES
W. Ray Taylor.
INVENTOR.
CHARLES S BRADLEY.
by Albert G. Davis
Atty

UNITED STATES PATENT OFFICE.

CHARLES S. BRADLEY, OF NEW YORK, N. Y., ASSIGNOR TO GENERAL ELECTRIC COMPANY, A CORPORATION OF NEW YORK.

ALTERNATING-CURRENT-MOTOR SYSTEM.

No. 910,638.

Specification of Letters Patent.

Patented Jan. 26, 1909.

Application filed May 7, 1906. Serial No. 315,534.

*To all whom it may concern:*

Be it known that I, CHARLES S. BRADLEY, a citizen of the United States, residing at New York, in the county of New York, State of New York, have invented certain new and useful Improvements in Alternating-Current-Motor Systems, of which the following is a specification.

My invention relates to the system described in my former patent, No. 615,954, dated December 13, 1898. In that patent I describe a method of operating induction motors at varying speeds, consisting of an induction motor-generator, the secondary of which supplies the motors, in combination with variable condensers in circuit with the secondary. As explained in that patent, by varying the amount of the condensers in circuit the speed of the secondary member of the motor-generator and the speed of the motors may be varied; the speed of the motor-generator falling as the motor-speed rises, and vice versa. At starting, that is, when the motors are at rest and the motor-generator is at its maximum speed and the frequency of the current in its secondary a minimum, the maximum capacity should be included in the circuit. After the motors have started, by gradually decreasing the capacity in the circuit the speed of the motor-generator is decreased and the motor-speed increased.

By my present invention I control the capacity in circuit with the secondary of the motor-generator automatically by means of a speed-responsive device, for instance, as a centrifugal governor mechanically connected to the motor-generator. This automatic device is arranged to maintain the proper capacity in circuit for all speeds of the motor-generator. Then, by providing additional manually-controlled means for adjusting the impedance of the circuit, the speed may be progressively controlled; for instance, if by the manual adjusting means the capacity is made a little greater than the proper amount for that speed, the speed of the motor-generator rises and the speed of the motors falls; and this increase of speed of the motor-generator further increases the capacity of the circuit by means of the automatic controlling device, so that progressive speed-variation is obtained. On the other hand, if by means of the manual controlling means the capacity is made a little less than the proper amount for the speed at which the machines are operating, the speed of the motor-generator falls and that of the motors rises, and this speed variation of the automatic device further decreases the capacity of the system. In this manner, by simply shifting the adjusting means in one direction or the other, a progressive semi-automatic speed-variation is obtained, depending in rate on the amount of movement of the manual adjusting means. Efficient electric braking may be obtained in this manner by shifting the manual adjusting means so as to increase the capacity in the circuit, since this produces an increase in speed of the motor generator and a tendency to decrease in speed in the motors, which consequently act as generators to return power to the line.

My invention will best be understood by reference to the accompanying drawing, in which—

Figure 1 shows diagrammatically a system of motor control arranged in accordance with my invention; and Fig. 2 shows a modification of the manual adjusting means.

In the drawings, A represents the primary member of an induction motor-generator of the type described in my former patent.

A' represents the secondary member, which is shown rotatable, and provided with collector rings through which current is supplied to the induction motors B, B.

C C represent condensers connected in parallel with the motors and controlled by the switches D D, which are arranged to cut variable portions of the condensers out of circuit, so as to vary their effective capacity.

E represents a centrifugal device mounted on the shaft of the generator and controlling the switches D by means of the lever F and connecting-rod G. This automatic device is adjusted so as to maintain the proper capacity in the secondary circuit of the motor-generator for all speeds.

C' C' represent auxiliary condensers or other impedance devices in parallel with the main condensers C C and controlled by the hand-operated switch H. By means of this switch the capacity of the secondary circuit of the motor-generator may be adjusted, and by increasing or decreasing the capacity, the speed of the motor-generator is increased or decreased with a consequent decrease or increase of speed of the motors. By shifting the switch member H in one direction or the other, a progressive variation of speed may be obtained. The switches D and centrifugal member E are shown in starting position, at which time the speed of the motor-generator is at its maximum, and the speed of the motors at a minimum. As the motors speed up and the motor-generator speed falls, the centrifugal weights of the device E are drawn inward by the spring, shifting rod G toward the right, and cutting out portions of the condensers.

Instead of employing auxiliary condensers or other impedance devices for the manual adjustment, means may be provided for acting directly on the connections between the centrifugal device and the switches. Such an arrangement is shown in Fig. 2, in which the hand-controlled link I is inserted between the lever F and rod G, so as to affect the action of the centrifugal device on the switch D.

The link I is slotted at its lower end and guided by a pin J entering the slot. At its upper end the link I is pivoted to a handle K, which itself is pivoted at k. The link I carries near its center a sleeve i surrounding the link L, which is thus movable at right-angles to the link I. The movement of the link I is vertical as viewed in Fig. 2, and is produced by an upward or downward movement of the handle K. The link L is provided at its end with pins engaging the members F and G, respectively. The slots in these two members engaged by the pins at the ends of link L are at an angle to each other, so that as the link I is moved up and down, carrying link L with it, the members F and G are brought nearer together, or are moved farther away from each other. Thus, the operation of the centrifugal device E on the switch D is modified by shifting the handle K.

Obviously, many other arrangements of manual adjustment may be employed, and consequently I do not desire to limit myself to the particular construction and arrangement of parts here shown, but aim in the appended claims to cover all modifications which are within the scope of my invention.

What I claim as new and desire to secure by Letters Patent of the United States, is:

1. In combination, an induction motor-generator, an induction motor supplied from the secondary of said motor-generator, condensers in circuit with said secondary, and automatic means for varying the capacity of said circuit with variation in the speed of said machines.

2. In combination, an induction motor-generator, an induction motor supplied from the secondary of said motor-generator, condensers in circuit with said secondary, and speed-responsive means mechanically connected to one of said machines and controlling said condensers.

3. In combination, an induction motor-generator, an induction motor supplied from the secondary of said motor-generator, condensers in circuit with said secondary, a switch adapted to cut variable portions of said condensers out of circuit, and automatic means for actuating said switch upon a variation of speed of said machines.

4. In combination, an induction motor-generator, an induction motor supplied from the secondary of said motor-generator, condensers in circuit with said secondary, a switch adapted to cut variable portions of said condensers out of circuit, speed-responsive means mechanically connected to one of said machines, and operative connections between said means and said switch.

5. In combination, an induction motor-generator, an induction motor supplied from the secondary of said motor-generator, condensers in circuit with said secondary, a centrifugal device connected to one of said machines, and means controlled by said device for cutting variable portions of said condensers out of circuit.

6. In combination, an induction motor-generator, an induction motor supplied from the secondary of said motor-generator, condensers in circuit with said secondary, a centrifugal device connected to one of said machines, a switch adapted to cut variable portions of said condensers out of circuit, and operative connections between said switch and said centrifugal device.

7. In combination, an induction motor-generator, an induction motor supplied from the secondary of said motor-generator, condensers in circuit with said secondary, a speed-responsive device mechanically-connected to said motor-generator, a switch in circuit with said condensers, and operative connections between said switch and said device.

8. In combination, an induction motor-generator, an induction motor supplied from the secondary of said motor-generator, condensers in circuit with said secondary, automatic means for varying the capacity of said circuit with variation in the speed of said machines, and manually-controlled means for adjusting the effect of said automatic means.

9. In combination, an induction motor-generator, an induction motor supplied from the secondary of said motor-generator, condensers in circuit with said secondary, automatic means for varying the capacity of said circuit with variation in the speed of said machines, and manually controlled means for adjusting the amount of capacity in said circuit.

10. In combination, an induction motor-generator, an induction motor supplied with current from the secondary of said motor-generator, condensers in circuit with said secondary, speed-responsive means mechanically-connected to one of said machines and controlling said condensers, and manually-controlled means for adjusting the amount of capacity in said circuit.

11. In combination, an induction motor-generator, an induction motor supplied with current from the secondary of said motor-generator, condensers in circuit with said secondary, a switch adapted to cut variable portions of said condensers out of circuit, automatic means for actuating said switch upon a variation of speed of said machines, and manually-operated means for adjusting the capacity of said circuit.

12. In combination, an induction motor-generator, an induction motor supplied from the secondary of said motor-generator, condensers in circuit with said secondary, a speed-responsive device mechanically connected to said motor-generator, a switch in circuit with said condensers, operative connections between said switch and said device, and manually-controlled means for adjusting the amount of capacity in said circuit.

13. In combination, an induction motor-generator, an induction motor supplied from the secondary of said motor-generator, condensers in circuit with said secondary, automatic means for varying the capacity of said circuit with variation in the speed of said machines, and manually-controlled means for adjusting the impedance of said circuit.

14. In combination, an induction motor-generator, an induction motor supplied with current from the secondary of said motor-generator, condensers in circuit with said secondary, speed-responsive means mechanically connected to one of said machines and controlling said condensers, and manually-controlled means for adjusting the impedance of said circuit.

In witness whereof, I have hereunto set my hand this fourth day of May, 1906.

CHARLES S. BRADLEY.

Witnesses:
   BENJAMIN B. HULL,
   MARGARET E. WOOLLEY.